United States Patent [19]
Matsumoto

[11] Patent Number: 6,104,420
[45] Date of Patent: Aug. 15, 2000

[54] IMAGE FORMING APPARATUS AND EXPOSURE SCANNING APPARATUS

[75] Inventor: Tatsumi Matsumoto, Yokohama, Japan

[73] Assignees: Toshiba Tec Kabushiki Kaisha, Tokyo; Kabushiki Kaisha Toshiba, Kawasaki, both of Japan

[21] Appl. No.: 09/253,053

[22] Filed: Feb. 19, 1999

[30] Foreign Application Priority Data

Feb. 20, 1998 [JP] Japan .................................. 10-038979

[51] Int. Cl.[7] ............................. B41J 2/385; G03G 13/04
[52] U.S. Cl. ........................................... 347/133; 358/448
[58] Field of Search .................................... 347/116, 129, 347/133; 358/448, 451, 452; 399/15, 182, 196, 198, 200

[56] References Cited

U.S. PATENT DOCUMENTS

| | | | |
|---|---|---|---|
| 4,918,542 | 4/1990 | Nagashima et al. | 358/451 |
| 5,093,674 | 3/1992 | Storlie | 347/116 |
| 5,512,927 | 4/1996 | Okamoto | 347/129 |
| 5,550,571 | 8/1996 | Shoji | 347/133 |
| 5,708,512 | 1/1998 | Ishizuka | 358/448 X |

FOREIGN PATENT DOCUMENTS

7-336506  12/1995  Japan .

*Primary Examiner*—Sandra Brase
*Attorney, Agent, or Firm*—Foley & Lardner

[57] ABSTRACT

After the digital copier has been assembled, a magnification error is calculated. The magnification error is a size ratio of a 100% copied image to an original image. The main CPU of the copier changes the rotational speed of the polygon-mirror driving motor to a new speed, in accordance with the magnification error. Further, the main CPU changes the speed of the main motor for the photosensitive drum in accordance with the new speed of the polygon-mirror driving motor. Therefore, the magnification of any copied image can be minutely adjusted by changing the rotational speed of the polygon-mirror and photosensitive dram.

11 Claims, 8 Drawing Sheets

· ERROR MADE IN READING OPTICAL SYSTEM

FIG. 10

· ERROR MADE IN LASER OPTICAL SYSTEM

FIG. 11

IMAGE FORMING APPARATUS AND EXPOSURE SCANNING APPARATUS

BACKGROUND OF THE INVENTION

The present invention relates to an image forming apparatus such as a composite-type digital copier that performs image-copying function, facsimile function, printer function and the like, and also relates to an exposure scanning apparatus for use in the image forming apparatus.

With a conventional image forming apparatus such as a digital copier, the error in copying magnification may fail to fall within a specified range in the manufacture line. After the image forming apparatus is delivered to a user, it may be demanded that the error in the 100%-magnification be eliminated (that is, the erroneous magnification of 100%±α be changed to 100%). In either case the magnification must be adjusted. To this end, the magnification is minutely adjusted in the conventional image forming apparatus.

Figure 10:
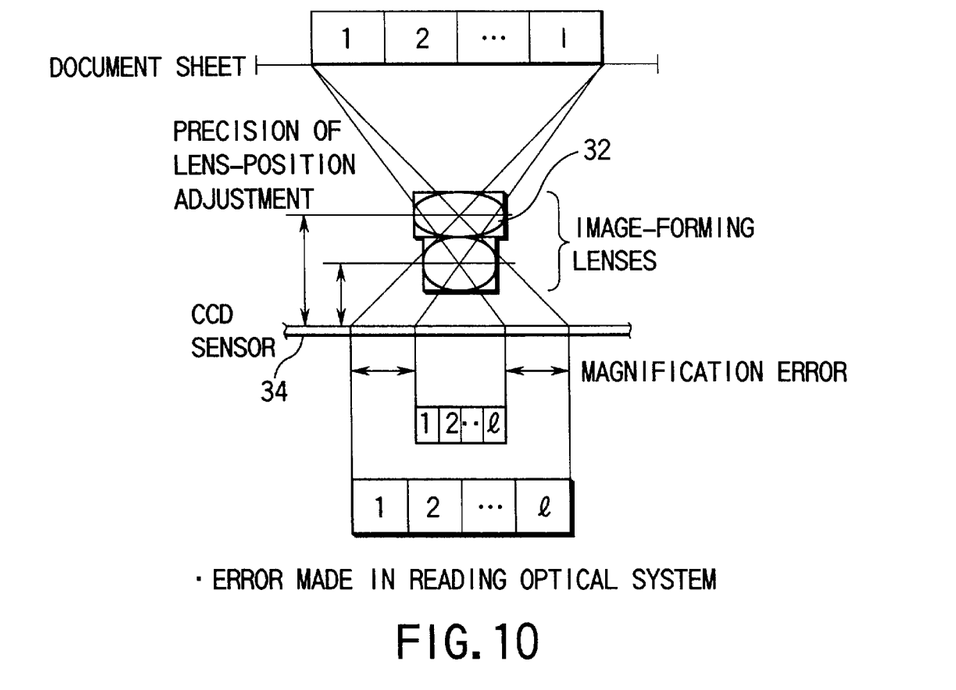
FIG. 10 is a diagram explaining how an error in the image-forming magnification may occur in the reading optical system incorporated in a conventional image forming apparatus.
Figure 11:
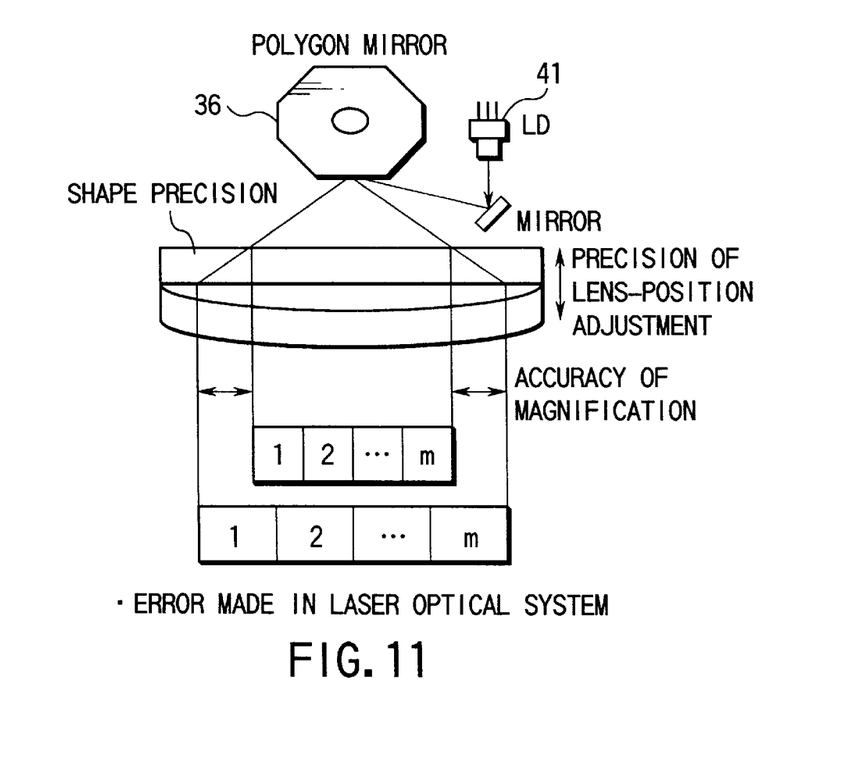
FIG. 11 is a diagram explaining how an error in the image-forming magnification may occur in the laser optical system provided in the conventional image forming apparatus.

In an image forming apparatus comprising image forming means that has a polygon mirror for performing optical scanning, an error in the image-forming magnification may occur in two systems, i.e., the reading optical system and the laser optical system, which are shown in FIGS. 10 and 11, respectively.

As seen from FIG. 10, an error in the image-forming magnification may occur in the reading optical system, due to changes in focal distance, which have resulted from inaccurate shapes of the lenses, and due to inaccurate adjusting of the focal distance. (To achieve accurate positioning of lenses, the lens holder must be a high-precision one. The range over which the focal distance can be adjusted is narrow, making it impossible to impart a completely correct focal distance to the reducing optical system.)

As seen from FIG. 11, an error in the image-forming magnification may occur in the laser optical system, due to inaccurate shapes of the lenses, and inaccurate positioning of the lenses.

Image data generated by the reading optical system that has such error-causing factors as described above is supplied to an image processing circuit. The image processing circuit processes the image data, enlarging or reducing the image represented by the data (by altering the method of reading data from a line memory), thereby minutely adjusting the magnification.

When the error in the image-forming magnification is eliminated by enlarging or reducing the image as above, however, the intervals of sampling image data interfere with the intervals of re-sampling the image data for enlarging or reducing the image. Inevitably, a pattern of alternate dark and light stripes, known as "moire," appear in the image. Moire is particularly conspicuous at a magnification nearly equal to 100%. It is generated not only in a high-periodicity image such as a halftone image, but also in a low-periodicity image such as a text image.

To suppress the moire, the image data may be passed through a low-pass filter, thereby smoothing the image represented by the image data. When data representing a text image is passed through a low-pass filter, however, the resultant text image is blurred.

BRIEF SUMMARY OF THE INVENTION

The object of the present invention is to provide an image forming apparatus which form images free of a pattern of alternate dark and light stripes and which forms clear text images, even if the image-forming magnification is minutely adjusted to a correct one, and to provide an exposure scanning apparatus for use in the image forming apparatus.

In order to achieve the object described above, an image forming apparatus according to the present invention comprises: light-emitting means for emitting a light beam in accordance with image data representing pixels arranged in a main scanning direction and a sub-scanning direction; an image carrier for forming an electrostatic image when scanned with the light beam emitted from the light-emitting means; scanning means for scanning the image carrier with the light beam emitted from the light-emitting means, the scanning means including a polygon mirror for reflecting the light beam; first drive means for rotating the polygon mirror; second drive means for rotating the image carrier, thereby to move a surface of the image carrier in the sub-scanning direction; developing means for applying developer onto the image carrier, thereby to develop the electrostatic image into a visible image; transfer means for transferring the visible image from the image carrier onto an image-forming medium; first speed-changing means for changing a rotational speed of the first drive means in accordance with an error in magnification in the main scanning direction, the error being a size ratio of the visible image transferred onto the image-forming medium to an image printed on a document sheet; and second speed-changing means for changing a rotational speed of the second drive means in accordance with the change in the rotational speed of the first drive means.

Since no reducing/enlarging circuits are used to adjust the magnification minutely, no moire will appear in the image transferred onto the image-forming medium.

An image of a scale is copied an image-forming medium in magnification of 100%. The image, thus copied, is compared with the real scale, thereby finding a dimensional difference between the images compared, i.e., an error in magnification. From the magnification error, thus obtained, there is calculated a desired speed at which the polygon mirror should be rotated. From the desired speed of the polygon motor, a desired speed is obtained at which the image carrier should be rotated.

The image forming apparatus may further comprises: facsimile means for receiving facsimile data from an external apparatus and providing the facsimile data as the image data; third speed-changing means provided in the first speed-changing means, for changing the rotational speed of the first drive means to a new rotational speed in accordance with the error in magnification in the main scanning direction, the error being a size ratio of the visible image represented by the facsimile data and transferred onto the image-forming medium; and storage means for storing data representing the new rotational speed, at which first drive means should be rotated in order to form an image represented by the facsimile data.

That is, the image forming apparatus according to the invention may have means for correcting error in magnification pertaining to the visible image represented by the facsimile data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a flow chart explaining how the reference clock data supplied to the main motor and polygon-mirror driving motor is changed from its initial value of;

DETAILED DESCRIPTION OF THE INVENTION

An embodiment of the invention will be described with reference to the accompanying drawings. The embodiment is a composite-type image forming apparatus that can operate as three apparatuses, i.e., a plain paper copier (PPC), a facsimile (FAX), and a printer (GDI: graphics display interface).

Figure 1:
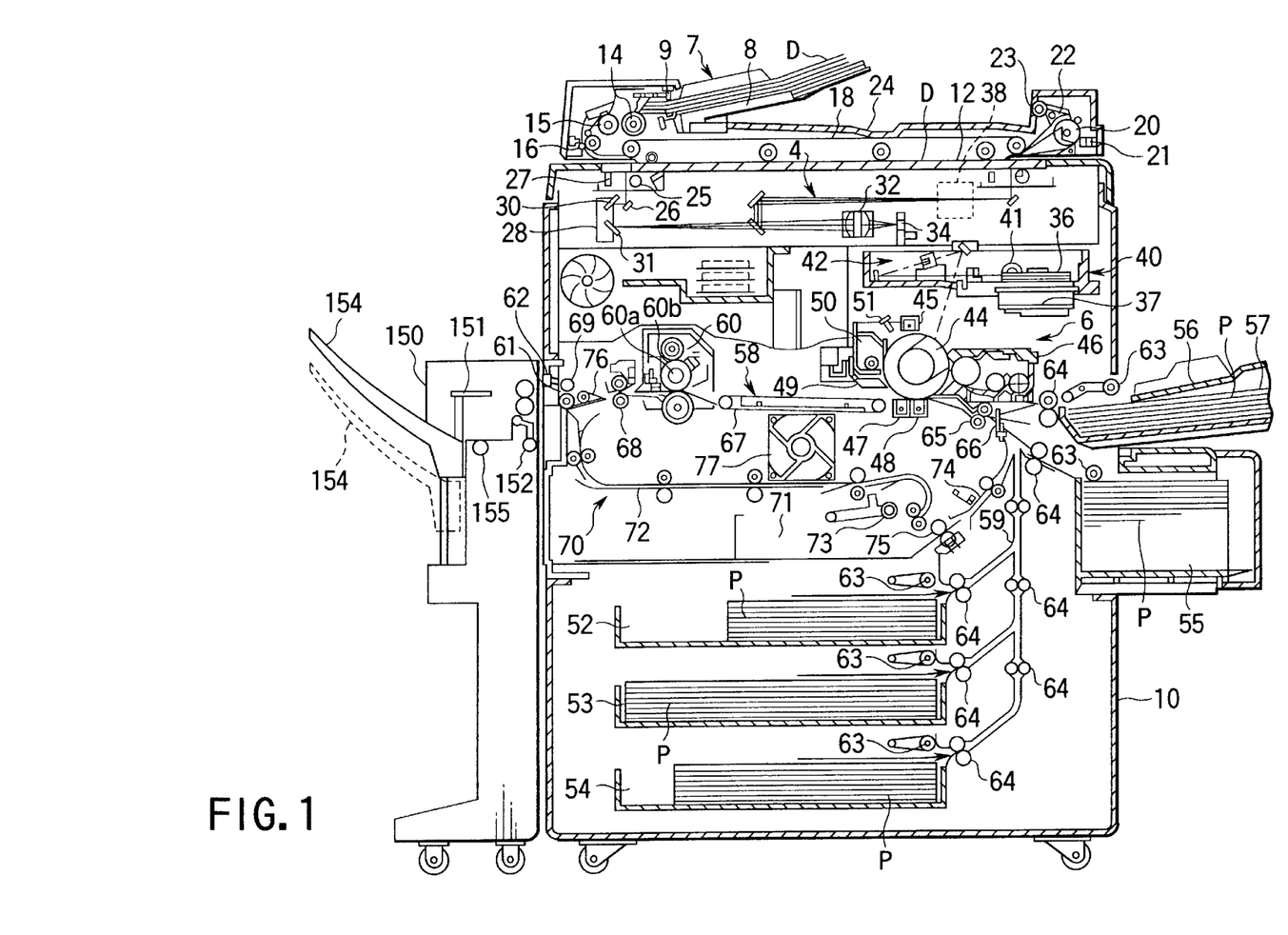
FIG. 1 is a schematic representation of an image forming apparatus according to the present invention.

FIG. 1 shows the internal structure of a digital copier, which is an example of the composite-type image forming apparatus according to the invention. The digital copier comprises a housing 10, a scanner section 4, a printer section 6. The scanner section 4 and printer section 6 are provided in the housing 10. The scanner section 4 functions as reading means as will be described later, whereas the printer section 6 functions as image forming means.

A document table 12, which is a transparent glass pate, is provided on the top of the housing 10 to support a document sheet D. An automatic document feeder (ADF) 7 is provided on the top of the housing 10, too, to feed a document sheet D onto the document table 12. The ADF 7 can be rotated with respect to the document table 12, between an opened position and a closed position. When rotated to the closed position, the ADF 7 holds a document sheet D in contact with the document table 12.

The ADF 7 comprises a document tray 8, an empty sensor 9, a pickup roller 14, a sheet-feeding roller 15, a pair of aligning rollers 16, and a conveyor belt 18. The document tray 8 is provided to hold document sheets D. The empty sensor 9 is used to detect whether or not the tray 8 holds any document sheets. The pickup roller 14 takes document sheets D, one by one, from the document tray 8. The sheet-feeding roller 15 is provided to feed document sheets D, one by one, from the pickup roller 14. The aligning rollers 16 are designed to align the leading edge of each document sheet D with a reference line. The conveyor belt 18 extends horizontally, covering almost the entire document table 12.

Document sheets D are placed on the document tray 8, each with its printed surface turned upwards. As the ADF 7 is driven, the pickup roller 14 takes the document sheets D sequentially from the tray 8, first the lowermost (i.e., the last page), then the second lowermost (i.e., penultimate page), and so on. The aligning rollers 16 align each document sheet taken from the tray 8. The conveyor belt 18 conveys the document sheet D from the aligning rollers 16 to a prescribed position on the document table 12. The sheet D lies on the table 12, with its one side contacting the table 12.

The ADF 7 further comprises a sheet-reversing roller 20, a non-reversing sensor 21, a flapper 22, a sheet-ejecting roller 23. The roller 20, sensor 21, flapper 22 and roller 23 are located in that end of the ADF 7 which opposes the aligning rollers 16 across the conveyor belt 18. The belt 18 takes a document sheet D away from the document table 12 after the scanner section 4 has read data from said side of the document sheet D, as will be described later. The sheet D passes through the flapper 21 and ejected by the sheet-ejecting roller 22 onto a document-ejecting section 24 provided on the upper surface of the ADF 7. To read data from the other side of the document sheet D, the flapper 22 is switched, whereby the roller 20 turns the sheet D upside down. The conveyor belt 18 conveys the sheet D, thus turned, to the prescribed position on the document table 12. This time, the sheet D lies on the table 12, with its other side contacting the document table 12.

The scanner section 4, which is provided in the housing 10, has an exposure lamp 25 and. a first mirror 26. The exposure lamp 25 is the source of light which illuminates that side of a document sheet D which contacts the document table 12. The first mirror 26 receives the light reflected from that side of the document sheet D and deflects the light in a predetermined direction. Both the exposure lamp 25 and the first mirror 26 are secured to a first carriage 27, which is located below the document table 12. The first carriage 27 is connected to a toothed belt (not shown), which is driven by a motor 38. Hence, the first carriage 27 can be driven back and forth, in parallel to the document table 12.

A second carriage 28 is provided below the document table 12. The second carriage 28 is connected to the toothed belt, like the first carriage 27. The second carriage 28 can therefore be driven in parallel to the document table 12, at half the speed the first carriage 27 is driven. The second carriage 28 holds a second mirror 30 and a third mirror 31. The surfaces of these mirrors 30 and 31 incline to each other at right angles. The second mirror 30 deflects the light deflected by the first mirror 26. The third mirror 31 deflects the light deflected by the second mirror 30.

Image-forming lenses 32 and a CCD sensor. 34 are arranged blow the document table 12. The image-forming lens 32 focuses the light deflected by the third mirror 31 mounted on the second carriage 28. The image-forming lens 32 can moved by a drive mechanism (not shown), in a plane containing the axis of the light deflected by the third mirror 31. Thus, the lens 32 can therefore form an image in various magnifications, on the light-receiving surface of the CCD sensor 34. The CCD sensor receives the light focused by the lens 32 and converts the light into an electric signal. The electric signal represents the data printed on the side of the document sheet D, which the scanner section 4 has scanned.

The printer section 6 comprises a laser exposure device 40, which works as a scanning device. The laser exposure device 40 comprises a semiconductor laser 41, a polygon mirror 36, a polygon-mirror driving motor 37, and a laser optical system 42. The laser 41 is the light source. The polygon mirror 36 is a scanning member for continuously deflecting a laser beam emitted from the semiconductor laser 41. The motor 37 rotates the polygon mirror 36 at a predetermined rotational speed. The laser optical system 42 deflects the laser beam deflected by the polygon mirror 36, guiding the laser beam to a photosensitive drum 44, which will be described later. The laser exposure device 40, thus constructed, is held by a support frame (not shown) that is provided in the housing 10.

The semiconductor laser 41 is turned on or off in accordance with the image data, the scanner section 4 has read from the document sheet D. The polygon mirror 36 and the laser optical system 42, both arranged in the laser exposure device 40, guides and applies the laser beam to the photosensitive drum 44, scanning the circumferential surface of the drum 44. An electrostatic latent image is thereby formed on the circumferential surface. of the photosensitive drum 44.

The photosensitive drum 44 is incorporated in the c as an image holder, and is located substantially in the center part of the housing 10. In operation, the drum 44 is rotated by a main motor 77. As the drum 44 is so rotated, its circumferential surface moves in a sub-scanning direction. While moving so, the circumferential surface of the drum 44 is scanned with the laser beam applied by the laser exposure 40. As a result, an electrostatic latent image is formed on the drum 44 as is desired.

A main charger 45, a developing device 46, a separation charger 47, a transfer charger 48, separation claws 49, a cleaner 50, and a discharger 51 are arranged in the order mentioned, around the photosensitive drum 44. The main charger 45 changes the circumferential surface of the drum 44 to a predetermined potential before an electrostatic latent image is formed on the circumferential surface of the drum 44. The developing device 46 applies toner (i.e., developer) to the electrostatic latent image formed on the drum 44, thereby forming a toner image in a desired density. The separation charger 47 and the transfer charger 48 are formed integral in one unit. The separation charger 47 is designed to separate a copy sheet P (image-forming medium) from the photosensitive drum 44. The transfer charger 48 is designed to transfer the toner image from the drum 44 to the copy sheet P. The separation claws 49 are provided to separate the copy sheet P from the circumferential surface of the drum 44. The cleaner 50 removes residual toner from the circumferential surface of the drum 44, cleaning the photosensitive drum 44. The discharger 51 is designed to electrostatically discharge the circumferential surface of the drum 44. The photosensitive drum 44 and the developing roller (not shown) incorporated in the developing device 46 are rotated by the main motor 77.

Three paper cassettes 52, 53 and 54 are provided in the lower part of the housing 10, one below another in the order mentioned. The paper cassettes 52, 53 and 54 are can be drawn out of the housing 10. They contain three stacks of copy sheets P, respectively. The copy sheets P contained in each cassette are of the same size, which is different from the size of the sheets P contained in any other cassette. A large-capacity sheet feeder 55 is located beside the paper cassettes 52, 53 and 54. The sheet feeder 55 can hold about 3,000 copy sheets P at a time, which are of the most frequently used size, e.g., A4-size. A feeder-cassette 57 is removably provided, right above the large-capacity sheet feeder 55. The feeder-cassette 57 serves as a manual feeding tray 56, as well.

A sheet-conveying path 58 is provided in the housing 10. The sheet-conveying path 58 extends from the sheet cassettes 52, 53 and 54 and the feeder 55. The path 58 passes through the image transfer section that is located between the photosensitive drum 44 and the transfer charger 48. At the end of the sheet-conveying path 58, a fixing device 60 is arranged. The fixing device 60 comprises a lamp 60a and a heat roller 60b. The lamp 60a is provided to apply heat to the heat roller 60b. The fixing device 60 opposes a side wall of the housing 10, which has a sheet outlet slot 61. A single-tray finisher 150 is provided outside the housing 10 and attached to said side wall, to receive any copy sheet P conveyed outwardly through the sheet outlet slot 61.

Three pickup rollers 63 are provided at the sheet cassettes 52, 53 and 54, respectively. Another pickup roller 63 is provided at the large-capacity feeder 55. Each pickup roller 63 takes copy sheets P, one by one, from the cassette or the feeder. Several pairs of sheet-conveying rollers 64 are arranged on the sheet-conveying path 58, for conveying a copy sheet P any pickup roller 63 has taken from the associated cassette or feeder.

A pair of register rollers 65 are provided on the sheet-conveying path 58, at the upstream of the photosensitive drum 44, for aligning the leading edge of a copy sheet P with the leading edge of the toner image formed on the circumferential surface of the drum 44. The rollers 65 rotate to feed the copy sheet P to the image transfer section, at the same speed as the circumferential speed of the drum 44. A pre-aligning sensor 66 is located on the sheet-conveying path 58, in the vicinity of the uppermost pair of sheet-conveying rollers 64. The sensor 66 detects whether or not a copy sheet P has reached the register rollers 65.

Any copy sheet P that each pair of pickup rollers 63 have taken from the associated cassette or feeder is conveyed by the sheet-conveying rollers 64 to the pair of register rollers 65. The register rollers 65 align the leading edge of a copy sheet P with the leading edge of the toner image formed on the drum 44. The copy sheet P thus registered is conveyed to the image transfer section.

In the image transfer section, the transfer charger 48 transfers the toner image from the circumferential surface of the drum 44 to the copy sheet P. The copy sheet P is separated from the circumferential surface of the drum 44 by means of the separation charger 47 and separation claws 49. The copy sheet P is then conveyed to the fixing device 60 by a conveyor belt 67, which is a component of the sheet-conveying path 58. The fixing device 60 applies heat to the copy sheet P, melting the toner and fixing the toner image. The copy sheet P is conveyed from the fixing device 60 by a pair of sheet-conveying rollers 68 provided in the housing 10. Finally, it is ejected into the finisher 150 from the housing 10 through the sheet outlet slot 61, by means of a pair of sheet-ejecting rollers 69 provided in the housing 10. A sheet sensor 62 is provided in the housing 10, adjacent to the sheet-ejecting rollers 69, for detecting a copy sheet P being ejected into the finisher 150.

An automatic sheet-reversing device 70 is provided below the sheet-conveying path 58, for reversing a copy sheet P conveyed from the fixing device 60 and conveying the sheet P back to the register rollers 65. The sheet-reversing device 70 comprises a temporary storage section 71, a sheet-reversing passage 72, a pickup roller 73, and a pair of sheet-conveying rollers 75. The storage section 71 stores copy sheets P temporarily. The sheet-reversing passage 72 branches from the sheet-conveying path 58, for reversing a copy sheet P conveyed from the fixing device 60 and guiding the same to the temporarily storage section 71. The pickup roller 73 takes copy sheets P, one by one, from the storage section 71. The sheet-conveying rollers 75 convey a copy sheet P from the pickup roller 73 to the register rollers 65 through a sheet passage 74. At the junction between the sheet-conveying path 58 and the sheet-reversing passage 72, a sorting gate 76 is provided for guiding a copy sheet P to either the sheet outlet slot 61 or the sheet-reversing passage 72.

To copy data on the other side of a copy sheet P which has data already copied on one side, the copy sheet P is conveyed from the fixing device 60 to the sorting gate 76. The sorting gate 76 guides the sheep P into the sheet-reversing passage 72. As the sheet P is conveyed through the passage 72, it is reversed. The sheet P thus reversed is stored in the temporary storage section 71 for some time. The pickup roller 73 and sheet-conveying rollers 75 convey the copy sheet P from the storage section 71 to the register rollers 65 through the sheet passage 74. The register rollers 75 register the copy sheet P, which is conveyed again to the image transfer section. In the image transfer section, a toner image is transferred from the drum 44 to the other side of the copy sheet P. The copy sheet P is then conveyed through the sheet-conveying path 58, passes through the fixing device 60, and is ejected into the finisher 150 by the sheet-ejecting rollers 69.

The finisher 150 accumulates copy sheets P that should be stapled together to form a copy of document. Each copy sheet P ejected into the finisher 150 through the sheet outlet slot 61 is aligned with the other sheets P already accumulated in the finisher 150. When all sheets P forming the document are aligned with one another, an arm 152 holds them together, and a stapler unit (not shown) staples the copy sheets P, thus forming a copy of document. Thereafter, the guide bar 151 is lowered, and the copy of document is ejected from the finisher 150 onto a finisher tray 154 by means of a document-ejecting roller 155.

The finisher tray 154 is lowered stepwise, each time by a distance determined by the number of copy sheets P that form a copy of document. The guide bar 151 is located at such a level that it remains out of contact with the copy of document laid on the finisher tray 154.

The finisher tray 154 is connected to a tray-shifting mechanism (not shown). The tray-shifting mechanism shifts the finisher tray 154 forward, backward, leftward or rightward in document-sorting mode, every time one copy of document is laid on the finisher tray 154.

An operation panel 80 is provided on the upperfront part of the housing 10. The panel 10 is operated to input and set various copying conditions such as the number of copies that should be made and the magnification in which data should be copied, to designate a part of the document sheet, which should be copied, and to generate a copying start signal.

Figure 2:
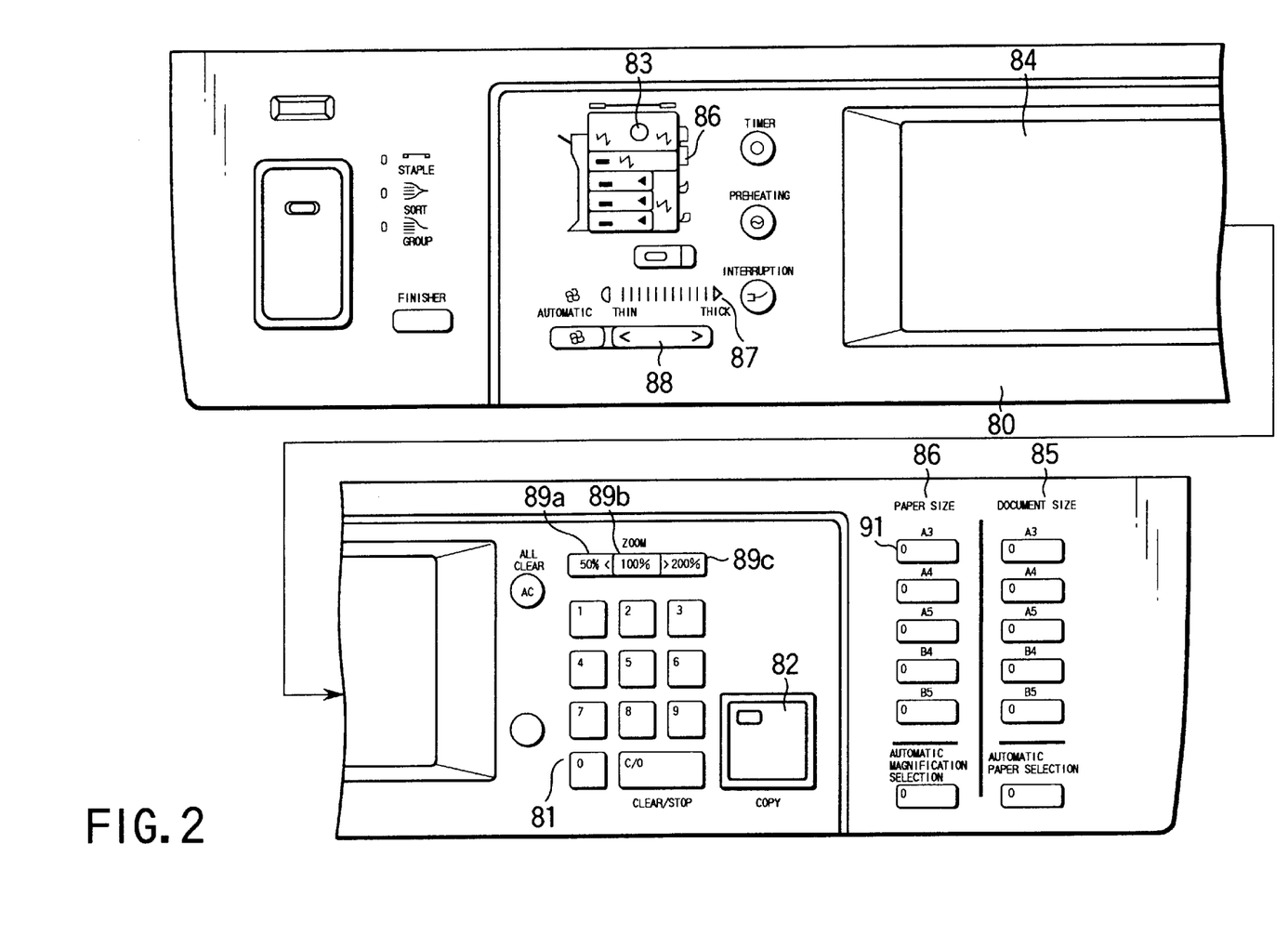
FIG. 2 is a diagram showing the operation panel of the image forming apparatus.

As FIG. 2 shows, the operation panel 80 has a ten-key pad 81, a copy key 82, indicators 83, a liquid crystal display 84, document size keys 85, sheet size keys 86, a density indicator 87, a density key 88, a reduction key 89a, a 100%-magnification key 98b, and an enlargement key 89c.

The ten-key pad 81 is operated to input and set various values, such as the number of copies that should be made. The copy key 82 is pushed to start copying. The indicators 83 are provided to indicate which sheet cassette is selected and whether a document sheet D or a copy sheet P is jamming or not.

The liquid crystal display 84 is designed to display various items of information, such as the number of copies that should be made and the magnification in which data should be copied. The liquid crystal display 84 functions as a touch panel, too. When a user touches any keys displayed, the instructions assigned to these keys are input. Further, the liquid crystal display 84 can call specific mode, which an operator can minutely adjust the magnification of the digital copier after the assembling thereof.

The document size keys 85 are depressed to set various sizes of document sheets D. The copy sheet size keys 86 are depressed to set various sizes of copy sheets P. The density indicator 87 indicates the copy density that has been set by operating the density key 88.

The reduction key 89a is pushed to decrease the magnification to any value ranging from 99% to 50%, in units of 1%. The 100%-magnification key 98b is depressed to set the magnification at 100%. The enlargement key 89c is pushed to increase the magnification to any value ranging from 101% to 400%, in units of 1%.

Figure 3:
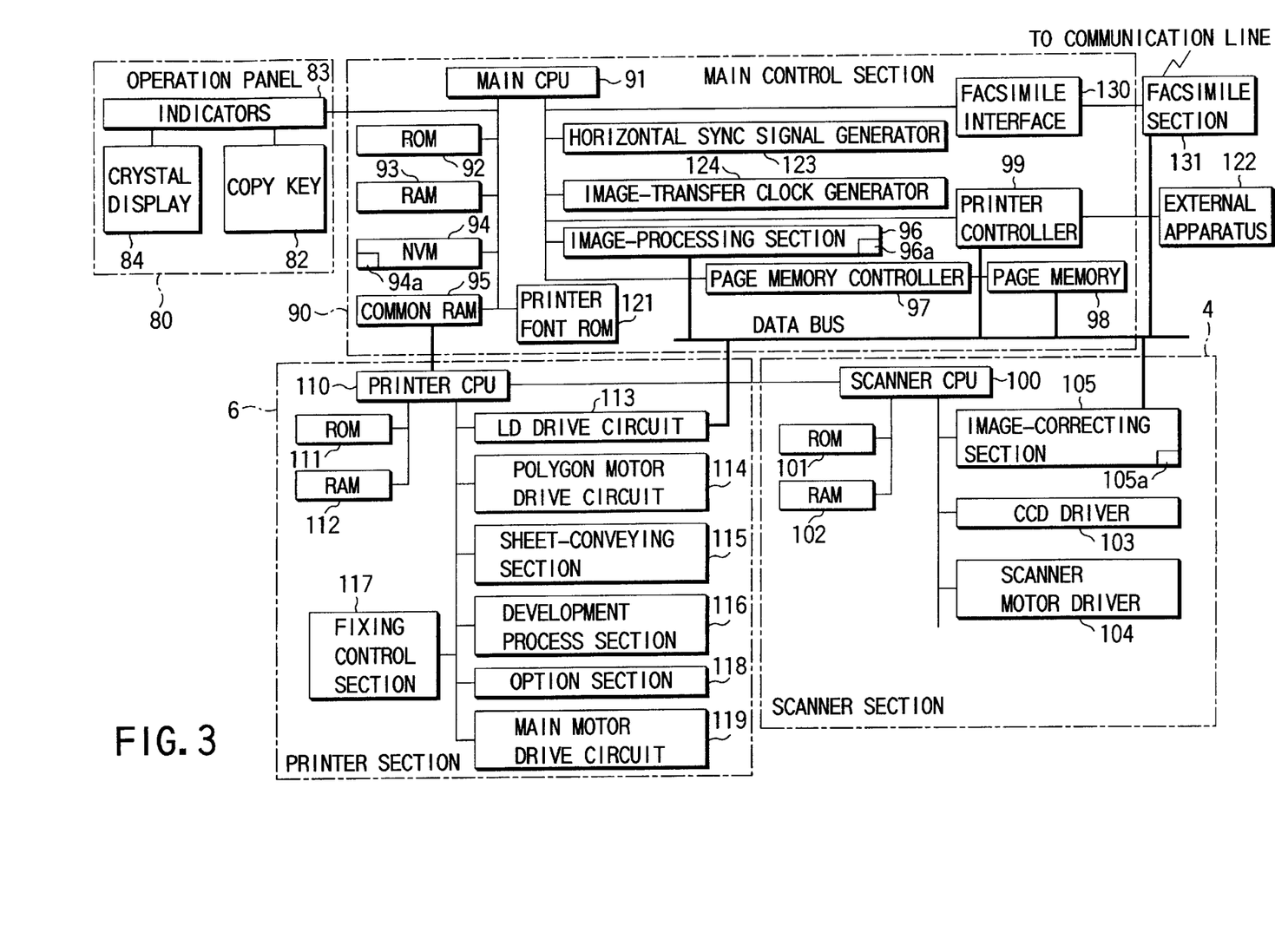
FIG. 3 is a block diagram illustrating the control system provided in the image forming apparatus.

FIG. 3 is a block diagram of the control system incorporated in the digital copier shown in FIG. 1, and schematically depicts the electrical connection of the components of the copier and the flow of various control signals.

The control system comprises a main CPU 91, a scanner CPU 100 and a printer CPU 110. As shown in FIG. 3, the main CPU 91 is incorporated in a main control section 90. The scanner CPU 100 is provided in the scanner section 4. The printer CPU 110 is provided in the printer section 6. Data is exchanged between the main CPU 91 and the printer CPU 110 through a common RAM 95 that is incorporated in the main control section 90. The main CPU 91 gives instructions to the printer CPU 110, which gives operation statuses to the main CPU 91.

Serial communication is achieved between the printer CPU 110 and the scanner CPU 100. The printer CPU 110 gives instructions to the scanner CPU 100, which gives operation statuses to the printer CPU 110. The digital copier may have a facsimile section 131 as an optional function. If so, the facsimile section 13 is connected to the main CPU 91 by a facsimile interface 130 provided in the main control section 90.

The main control section 90 comprises a ROM 92, a RAM 93, an NVM (Nonvolatile RAM) 94, an image-processing section 96, a page memory controller 97, a page memory 98, a printer controller 99, a printer font ROM 121, a horizontal sync signal generator 123, and an image-transfer clock generator 124, in addition to the main CPU 91, common RAM 95 and facsimile interface 130.

The main CPU 91 is used to control the other components of the main control section 90. The ROM 92 stores various control programs. The RAM 93 is provided to store data temporarily.

The NVM 94 is a nonvolatile memory to which power is supplied from a battery (not shown). The NVM 94 therefore keep holding the data it has stored, after the power supply switch to the digital copier is turned off. The NVM 94 has an initial value table 94a. The table 94 stores the default values of the polygon mirror 36 and initial values of the main motor 77, which have been set for the different resolutions prescribed for the image sources of copier (PPC) function, facsimile (FAX) function and printer (GDI) function. The common RAM 95 is provided to accomplish communication between the main CPU 91 and the printer CPU 110.

The image-processing section 96 comprises an image-processing circuit and a line memory 96a. The image-processing circuit performs various processes, such as trimming, masking, compression, and expansion, on image data. The image data processed by the image-processing circuit is stored in the line memory 96a. The printer font ROM 121 stores font data that corresponds to code data such as character codes.

The printer controller 99 receives code data (e.g., character codes) from an external apparatus 122 (e.g., a personal computer). The code data includes data representing a specific character size and particular resolution. From the code data the controller 99 generates image data having the character size and the resolution, with reference to the front data stored in the printer font ROM 121.

The horizontal sync signal generator 123 generates a horizontal sync signal that is synchronous with the rotation of the polygon mirror 36. The image-transfer clock generator 124 generates an image-transfer clock signal for controlling the timing of transferring image data.

The page memory controller 97 is provided to write image data into, and read the image data from, the page memory 98. The page memory 98 has a storage area for storing a plurality of pages of data. Compressed image data is supplied from the scanner section 4 to the page memory 98. The page memory 98 stores the compressed image data, in units of pages.

The scanner section 4 comprises the scanner CPU 100, a ROM 101, a RAM 102, a CCD driver 103, a scanner motor driver 104, and an image-correcting section 105. The scanner CPU 100 controls all other components of the scanner section 4. The ROM 101 stores control programs. The RAM 102 stored data temporarily. The CCD driver 103 drives the CCD sensor 34. The scanner motor driver 104 controls the rotational speed of the motor 38, which moves the first carriage 27 and the second carriage 28. It should be recalled that the first carriage 27 holds the exposure lamp 25 and first mirror 26 and the second carriage 28 holds the second mirror 30 and third mirror 3.

The image-correcting section 105 comprises an A/D converter, a shading-correcting circuit, a gamma-correcting circuit, and a line memory 105a. The A/D converter receives an analog signal from the CCD sensor 34 and converts the signal to a digital signal. The shading-correcting circuit and gamma-correcting circuit compensate for changes in the threshold level for the digital signal supplied from the A/D converter. The line memory 105a temporarily stores the digital signal thus corrected by the shading-correcting circuit and gamma-correcting circuit. The image-correcting section 105 further comprises an exposure lamp controller (not shown) and a driver (not shown, either). The exposure lamp controller controls the image-correcting section 105. The driver drives a mechanism, which moves the image-forming lens 32 so that the magnification, in which data should be copied, may be adjusted to a desired value.

The printer section 6 comprises the printer CPU 110, a ROM 111, a RAM 112, an LD drive circuit 113, a polygon motor drive circuit 114, a sheet-conveying section 115, a development process section 116, a fixing control section 117, an option section 118, and main motor drive circuit 119. The printer CPU 110 controls all other components of the printer section 6. The ROM 111 store control programs. The RAM 112 is provided for storing data. The LD drive circuit 113 turns the semiconductor laser 41 on and off. The polygon motor drive circuit 114 controls the rotational speed of the polygon motor incorporated in the laser unit 40. The sheet-conveying section 115 controls the conveyance of copy sheets P through the sheet-conveying path 58. The development process section 116 cooperates with the main charger 45, developing device 46, transfer charger 48 and the like, to charging the drum 44, develop a toner image on the drum 44, and transfer the toner image from the drum 44 to a copy sheet P. The fixing control section 117 controls the fixing device 60. The main motor drive circuit 119 controls the sheet sensor 62, pre-aligning sensor 66 and option section 118. The circuit 119 controls the rotational speed of the main motor 77, too.

Figure 4:
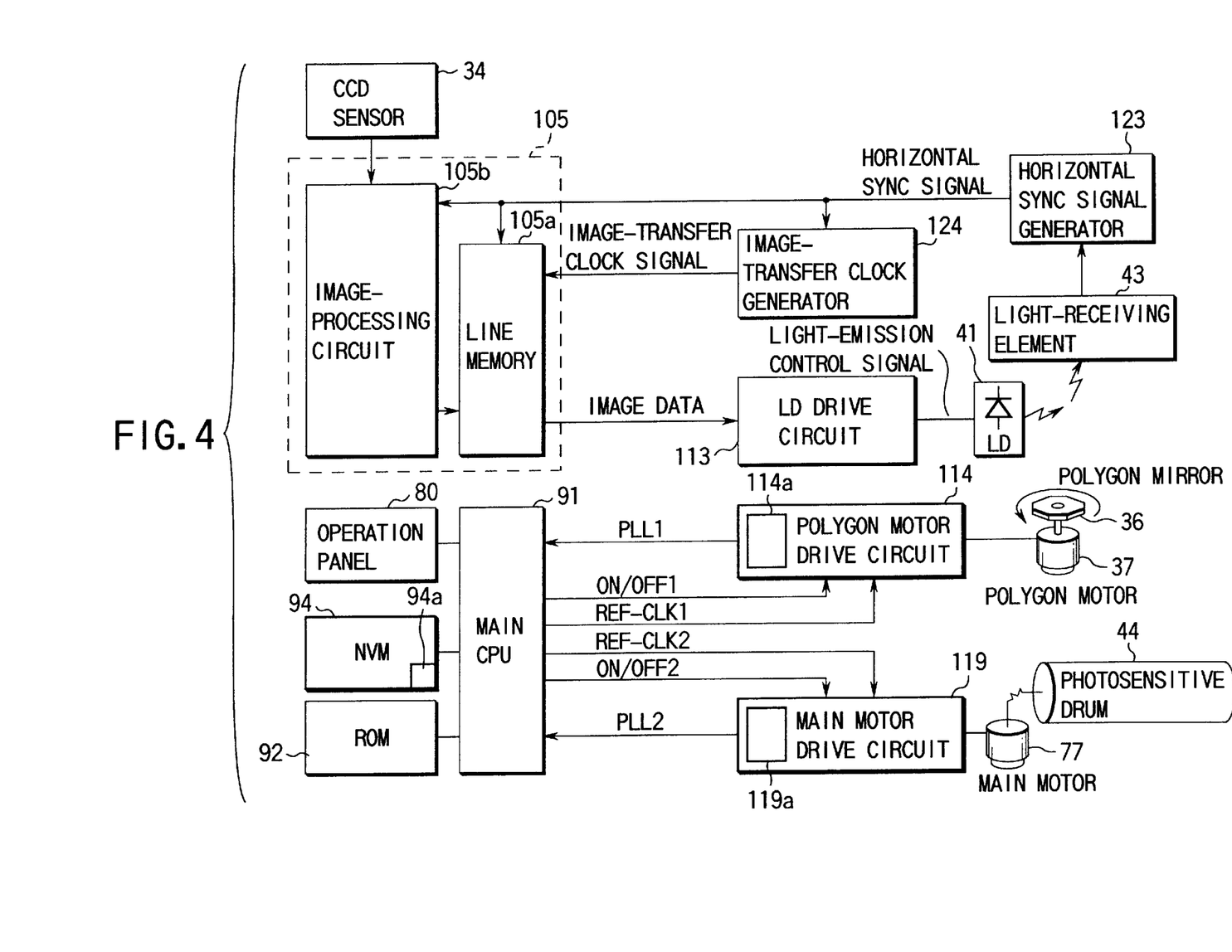
FIG. 4 is a block diagram illustrating the system for controlling the speeds of the main motor and polygon-mirror driving motor, both provided in the apparatus.

As shown in FIG. 4, the polygon motor drive circuit 114 has an IC (Integrated Circuit) 114a for controlling the polygon-motor driving motor 37. The IC 114a receives a reference clock data REF-CLK 1 from the main CPU 91 and generates an FG pulse signal having a motor-driving frequency, and the pulse signal is supplied to the polygon-mirror driving motor 37, controlling the rotational speed of the motor 37.

As shown in FIG. 4, too, the main motor drive circuit 119 has an IC 119a for controlling the main motor 77. The IC 119a receives a reference clock data EF-CLK 2 from the main CPU 91 and generates an FG pulse signal having a motor-driving frequency, and the pulse signal is supplied to the main motor 77, controlling the rotational speed of the main motor 77.

The facsimile section 131 receives facsimile data generated by compressing bit-map data transmitted from an external apparatus through a communication line such as the public telephone line. The facsimile section 131 converts the facsimile data to image data, which is supplied to the main control section 90 through the facsimile interface 130.

The image-processing section 96, page memory controller 97, page memory 98, printer controller 99, image-correcting section 105 and LD drive circuit 113 are connected by a data bus 120.

How the rotational speeds of the polygon mirror 36 and photosensitive drum 44 are controlled will be explained, with reference to the block diagram of FIG. 4, the mechanism diagram of FIG. 5A and the timing chart of FIG. 5B.

To copy the data printed on a document sheet D, the main CPU 91 generates a control signal ON/OFF1 and a reference clock data REF-CLK1 in accordance with a control program stored in the ROM 92. The control signal ON/OFF1 is supplied to the polygon motor drive circuit 114, causing the circuit 114 to start driving the polygon-mirror driving motor 37. The reference clock data REF-CLK1 is supplied to the polygon motor drive circuit 114, for controlling the rotational speed of the motor 37. The main CPU 91 also generates a control signal ON/OFF2 and a reference clock data REF-CLK2. The control signal ON/OFF2 is supplied to the main motor drive circuit 119, causing the circuit 119 to start driving the main motor 77. The reference clock data REF-CLK2 is supplied to the circuit 119, for controlling the rotational speed of the motor 77.

In the polygon motor drive circuit 114, the control signal ON/OFF1 is supplied to the IC 114a. The IC 114a generates an FG pulse signal having a motor-driving frequency. The FG pulse signal is supplied to the polygon-mirror driving motor 37 and controls the rotational speed of the motor 37. The rotational speed of the polygon mirror 36 is therefore controlled. When the rotational speed of the polygon mirror 36 becomes stable at the value corresponding to the reference clock data REF-CLK1, the signal PLL1 generated by the IC 114a and supplied to the main CPU 91 is enabled (for example, rising to high level). The main CPU 91 determines, from the signal PLL1, that the rotational speed of the polygon mirror 36 has become stable.

In the main motor drive circuit 119 that has received the control signal ON/OFF2 from the main CPU 91, the IC 119a provided to control the main motor 77 generates an FG pulse signal having a motor-driving frequency. The FG pulse signal is supplied to the main motor 77 and controls the rotational speed of the motor 77. The rotational speed of the photosensitive drum 44 is therefore controlled. When the speed of the drum 44 becomes stable at the value corresponding to the reference clock data REF-CLK2, the signal PLL2 generated by the IC 119a and supplied to the main CPU 91 is enabled. The main CPU 91 determines, from the signal PLL1, that the rotational speed of the photosensitive drum 44 has become stable.

Upon receipt of the signals PLL1 and PPL2 which have been supplied from the polygon motor drive circuit 114 and main motor drive circuit 119, respectively, and which have been enabled, the main CPU 91 causes the CCD sensor 34 to can the document sheet D placed on the document table 12. The CCD sensor 34 reads the image printed on the document sheet D and converts the same to image data. The image data is supplied to the scanner section 4. In the scanner section 4, the image-correcting section 105 performs shading correction, gamma correction and the like on the image data. One line of image data is stored into the line memory 105a.

If the digital copier receives facsimile data transmitted from an external apparatus through the public telephone line, the facsimile section 131 compresses or expands the facsimile data, thereby generating image data having a prescribed resolution. The image data is stored into the line memory 96a provided in the image-processing section 96. To print an image represented by the code data input from the external apparatus 122, the printer controller 99 converts the code data to dot-character image data, with reference to the front data stored in the printer font ROM 121. The dot-character image data is stored, line by line, into the line memory 96a provided in the image-processing section 96.

The image data is output to the LD drive circuit 113 from the line memory 105a incorporated in the image-correcting section 105, in synchronism with the image-transfer clock signal supplied from the image-transfer clock generator 124. The image data output from the LD drive circuit 113 is supplied to the semiconductor laser 41. The laser 41 generates a laser beam from the image data. As shown in FIG. 5A, the polygon mirror 36 reflects the laser beam, applying the beam to the image-forming area of the photosensitive drum 44.

Figure 5A:
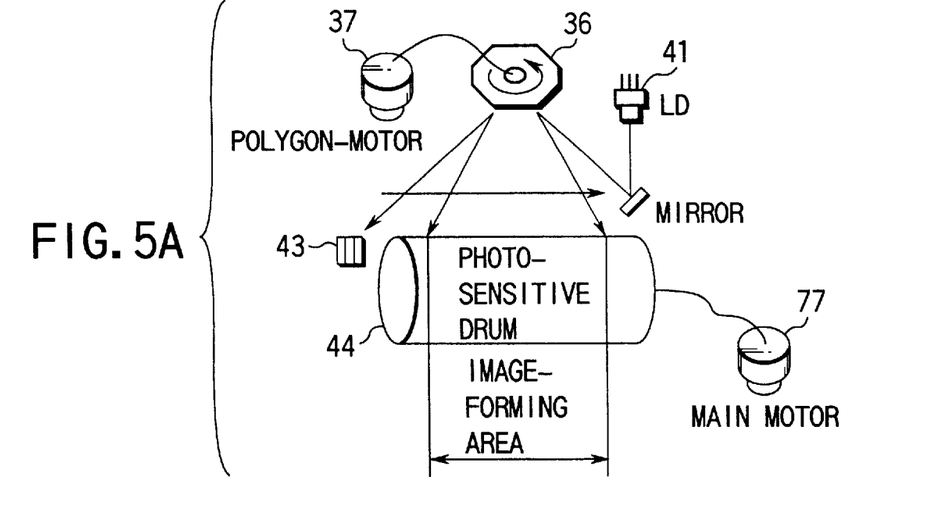
FIG. 5A is a diagram explaining how the main motor and the polygon-mirror driving motor work.
Figure 5B:
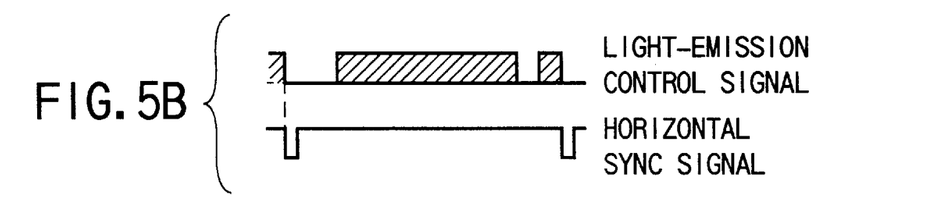
FIG. 5B is a timing chart showing control signals.

The laser beam reflected by the polygon mirror 36 is applied to a light-receiving element 43 that is located outside the image-forming area of the drum 44 as shown in FIG. 5A. Upon receipt of the laser beam, the element 43 generates a horizontal sync signal as is illustrated in FIG. 5B.

The image-transfer clock generator 124 generates an image-transfer clock signal CLK. The image-transfer clock signal CLK is synchronous with the horizontal sync signals which the light-receiving element 43 and horizontal sync signal generator 123 have generated in synchronism with the rotation of the polygon mirror 35.

There are two main causes of an error in image-forming magnification. The first is an error in the reading optical system shown in FIG. 10. The second is an error in the laser optical system 42 shown in FIG. 11.

One error that may occur in the reading optical system is an incorrect focal distance which results, as shown in FIG. 10, from the inadequate positioning of the image-forming lens 32. Another error that may occur in the reading optical system is an insufficient shape of the lens 32.

One error that may occur in the laser optical system 42 is incorrect shape and/or positioning of the polygon mirror 36. Another error that may occur in the system 42 is incorrect shape and/or positioning of the lenses and mirrors.

Figure 6A:
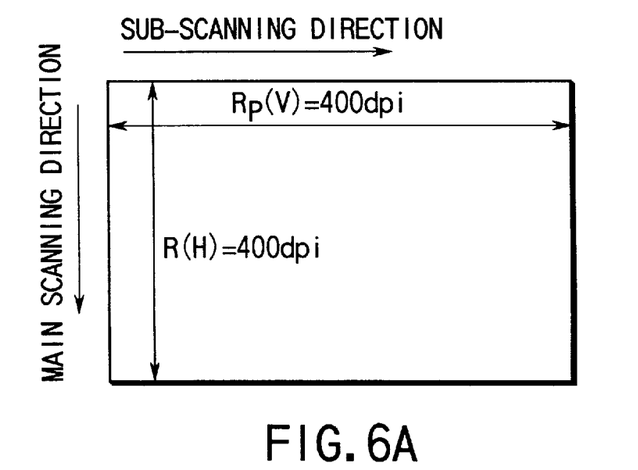
FIG. 6A is a diagram showing the resolution in the main scanning direction and the resolution in the sub-scanning direction, both attained in the image forming apparatus.
Figure 6B:
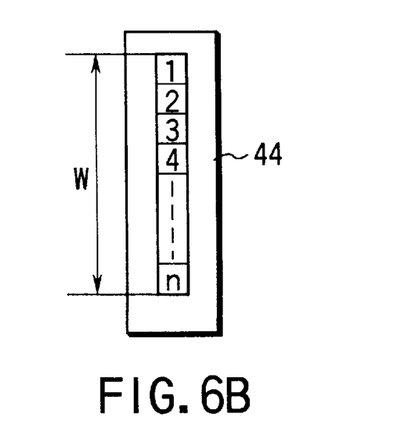
FIG. 6B is a diagram explaining the print width in the main scanning direction.

Assume an error of (400) dpi (dots per inch) occurs while printing an image having a width W, as shown in FIGS. 6A and 6B, in resolution of 400 dpi (dots per inch) in both the main scanning direction and the sub-scanning direction. In this case, the magnification in the main scanning direction depends on the rotational speed of the polygon mirror 36. Namely, if the rotational speed of the mirror 36 is raised from a preset value, the magnification will increase and, hence, the width W (FIG. 6B) will become longer. Conversely, if the rotational speed of the mirror 36 is lowered from a preset value, the magnification will decrease and, hence, the width W (FIG. 6B) will become shorter.

The IC 114a incorporated in the polygon motor drive circuit 114 determines the rotational speed of the polygon-motor driving motor 37 on the basis of the reference clock data REF-CLK1. The clock signal REF-CLK1 has been generated the main CPU 91 in accordance with the default values of the polygon mirror 36 which are stored in the initial value table 94a. The frequency of the reference clock data REF-CLK1 is changed, whereby the FG pulse signal that the IC 114a generates is changed in terms of its motor-driving frequency. The FG pulse signal is supplied to the polygon-mirror driving motor 37, thereby changing the rotational speed of the polygon mirror 36.

The initial frequency for the reference clock data REF-CLK1 is stored in the initial value table 94a provided in the NVM 94. In other words, the initial frequency has been written into the internal register of the main CPU 91 and is used, whenever necessary, to drive the polygon-mirror driving motor 37.

The frequency Fv [MHz] of the FG pulse signal supplied to the motor 37, the rotational speed Np [rpm] of the polygon-mirror driving motor 37, and the image resolution Rp(H) [dots/mm] in the main scanning direction have the following relation:

$$Fv = 10^{-6} \times Rp(H) \times V \tag{1a}$$

The scanning speed V [mm/s] is given as follows:

$$V = (2 \times Np/60) \times 2\pi \times f \tag{1b}$$

where Np is the rotational speed [rpm] of the polygon-mirror driving motor 37 and f is the value [mm/rad] of fθ characteristic.

On the basis of the equations (1a) and (1b), the rotational speed Np of the motor 37 can be represented as follows:

$$Fv = 10^{-6} \times Rp(H) \times 4\pi \times (Np/60) \times f$$

$$\therefore Np = 60 \times Fv \times 10^{-6}/(4\pi \times Rp(H) \times f) \tag{1}$$

As can be understood from the equation (1), the rotational speed of the polygon-mirror driving motor 37 is changed by varied the motor-driving frequency Fv. That is, the magnification in the main scanning direction can be changed.

The magnification in the sub-scanning direction, i.e., the resolution Rp(V), depends on the rotational speed Np of the polygon-mirror driving motor 37. If the magnification in the main scanning direction is adjusted by changing the rotational speed Np only, without changing the rotational speed of the photosensitive drum 44, an error will be made in the magnification in the sub-scanning direction. It follows that the rotational speed of the main motor 77 must be changed to alter the rotational speed of the drum 44, when the rotational speed of the polygon-mirror driving motor 37 is changed.

The circumferential speed Vp [mm/s] of the drum 44 is given as follows:

$$Np=60\times Vp\times Rp(V)/N/n$$

$$\therefore Vp=\{(Np\times N)/(60\times Rp(V)\}/n \quad (2)$$

where Np is the rotational speed [rpm] of the polygon-mirror driving motor 37, Rp(V) is the resolution [dots/mm] in the sub-scanning direction, N is the number of faces the polygon mirror 36 has, and n is the number of laser beams applied to the drum 44.

Thus, the main CPU 91 generates a reference clock data REF-CLK2 that has such a frequency as to rotate the photosensitive drum 44 at the circumferential speed Vp defined above. More precisely, the main CPU 91 rewrites the reference clock data stored in the initial value (default) table 94a provided in the NVM 94. The reference clock data REF-CLK2 is supplied to the main motor drive circuit 119.

In the main motor drive circuit 119, the IC 119a provided to control the main motor 77 alters the motor-driving frequency of the FG pulse signal. The FG pulse signal is supplied to the main motor 77, changing the rotational speed of the motor 77. The rotational speed of the photosensitive drum 44 is thereby changed. As a result, the resolution in the sub-scanning direction is changed.

As described above, the rotational speed of the polygon-mirror driving motor 37 and the rotational speed of the main motor 77 are changed by changing the reference clock data REF-CLK1 and REF-CLK2. Therefore, the magnification in the main scanning direction can adjusted to a desired value, and the error in the magnification in the sub-scanning direction, inevitably made due to the adjustment of the magnification, can be eliminated. Hence, the magnification can be minutely adjusted in the process of forming a 100%-magnification image on a copy sheet P (image-forming medium). Since no reducing/enlarging circuits are used to adjust the magnification minutely, no moire will appear in the image formed on the copy sheet P.

Figure 7:
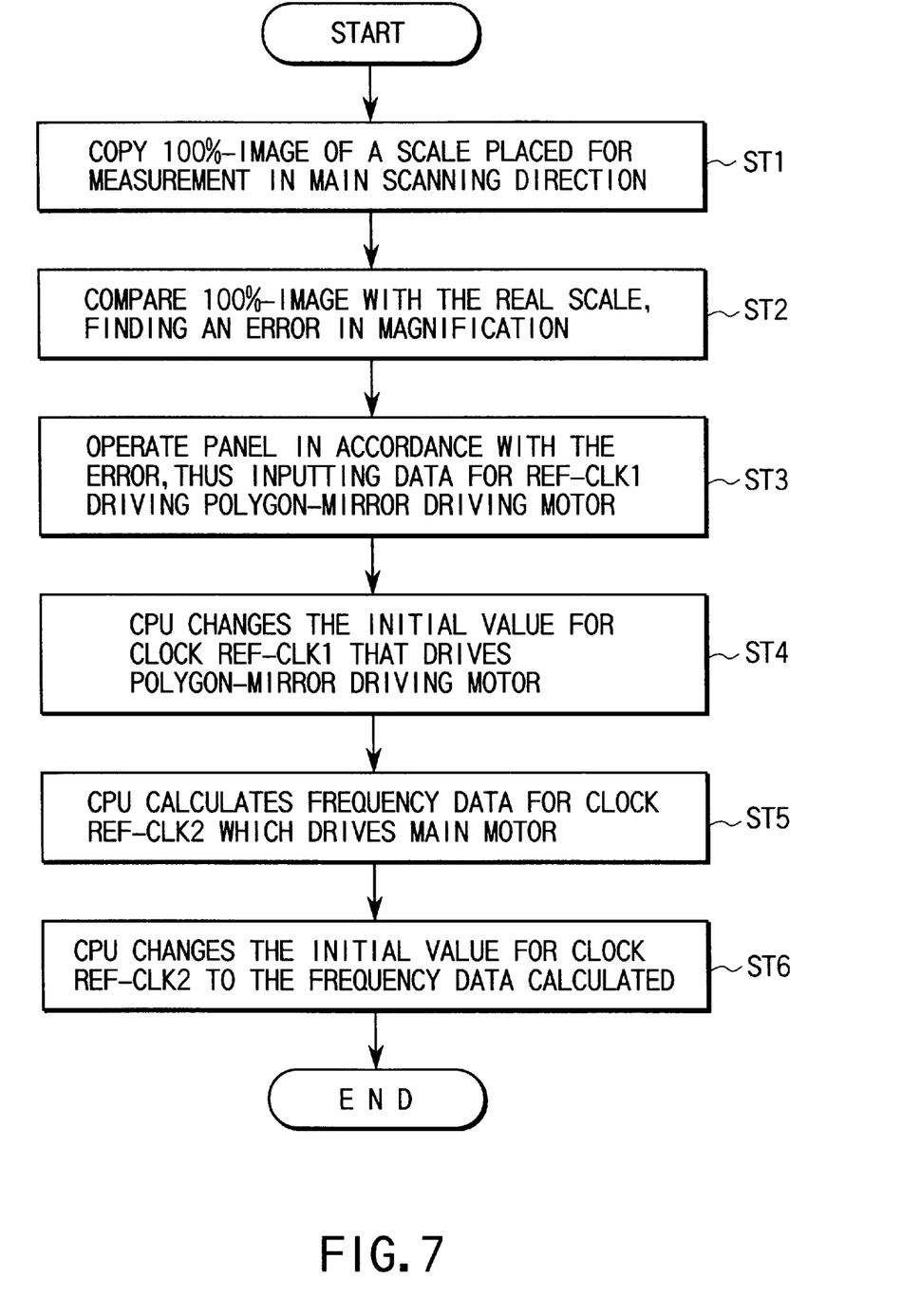
Figure 8:
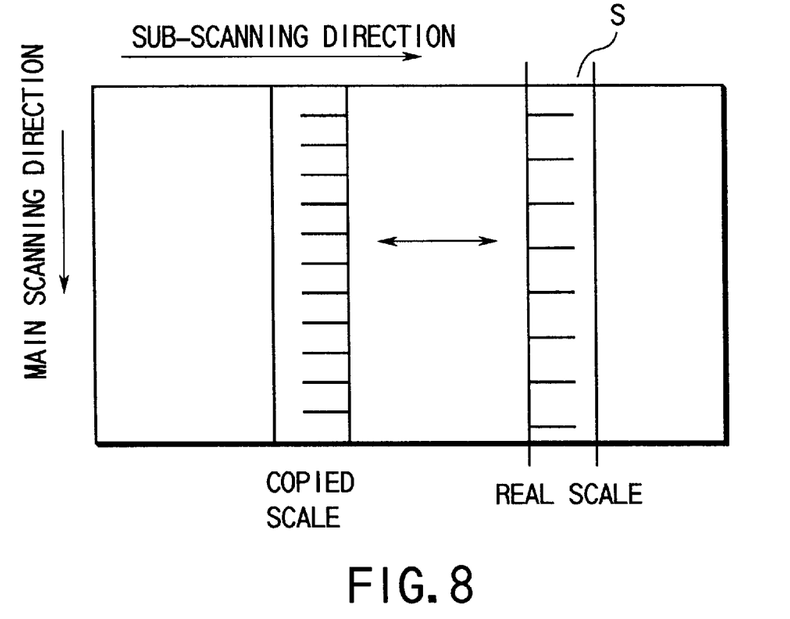
FIG. 8 is a diagram depicting an image of a scale, copied at magnification of 100%, and an actual image of the scale.
Figure 9:
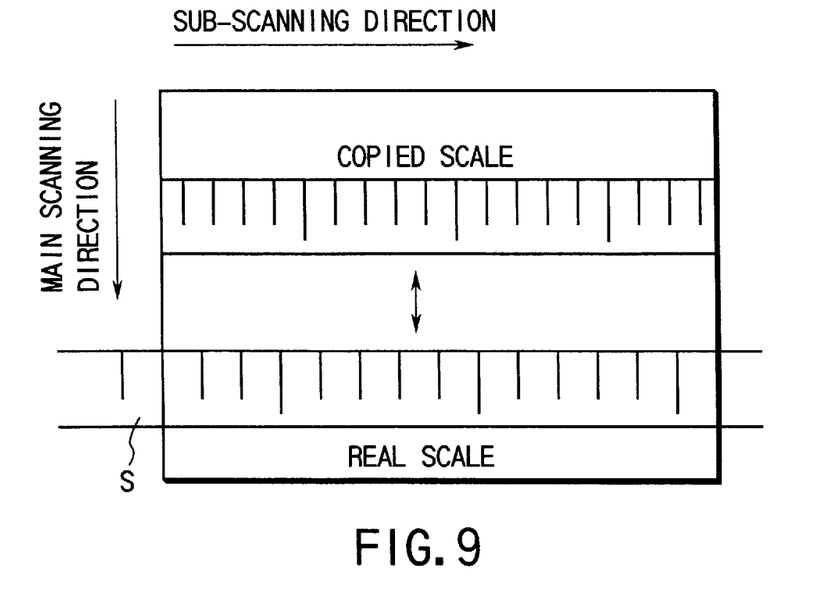
FIG. 9 is a diagram depicting another image of the scale, copied at magnification of 100%, and an actual image of the scale.

How the magnification is minutely adjusted in the process of forming a 100%-magnification image will be explained, with reference to the flow chart of FIG. 7 and also with FIGS. 8 and 9.

Assume that it is necessary to adjust the magnification to provide a 100%-magnification copy of the data printed on a document sheet D, while the digital copier remains in the assembly line. In this case, an operator lays a scale S on the document table 12, aligning the scale S in the main scanning direction, as is illustrated in FIG. 8. A 100%-magnification image of the scale S is copied (Step ST1). The operator compares the 100%-magnification image with the real scale S in terms of size, calculating a dimensional ratio of the image to the scale S. In other words, an error in magnification is determined (Step ST2).

If the error determined exceeds a tolerable maximum value, the operator operates the panel 80, setting the digital copier into adjustment mode. Then, the operator operates the ten-key pad 81 on the panel 80, inputting data representing the motor-driving frequency that corresponds to the magnification error (Step ST3). In accordance with the data input, the CPU 91 changes the initial value (default) for the clock data REF-CLK1 (Step ST4) which is stored in the initial value table 94a provided in the NVM 94.

When the rotational speed of the polygon-mirror driving motor 37 is changed, the main CPU 91 calculates the circumferential speed of the photosensitive drum 44 in accordance with the equation (2). From the circumferential speed of the drum 44, thus obtained, the main CPU 91 calculates the frequency data of the reference clock data REF-CLK2 to be supplied to the main motor drive circuit 119 (Step ST5).

The main CPU 91 rewrites the initial frequency data for the data REF-CLK2, which is stored in the initial value table 94a, to the frequency data calculated in Step ST5 (Step ST6). The magnification is thereby minutely adjusted.

As indicated above, the operator calculate a frequency for a reference clock data. Instead, the main CPU 91 may calculate the frequency from the ratio which the operator has input by operating the ten-key pad 81 and which represents a magnification error.

As described above, the magnification is minutely adjusted in the process of forming a 100%-magnification image on a copy sheet P, by changing both the main-scanning speed and the sub-scanning speed. Therefore, no moire appears in the image formed on the copy sheet P.

The magnification for the image represented by facsimile data transmitted from an external apparatus is minutely adjusted in the following manner. First, the facsimile section 131 receives facsimile data transmitted from the external apparatus and representing an image of a scale. An image of the scale is then formed on a copy sheet P. The image is compared with an original image of the scale, which has been read at the external apparatus, and a dimensional ratio of the images, i.e., an error in magnification is calculated. From the magnification error, thus determined, the rotational speeds of the polygon-mirror driving motor and main motor are calculated and stored, as values for the facsimile function, into the initial value table 94a.

The magnification in which an image is to be printed under the control of the printer controller 99 is minutely adjusted in the following manner. First, a code data served as an image of a scale and supplied from an external apparatus is supplied to the printer controller 99. The controller 99 decodes the code data, generating dot image data. The image data is processed, forming an image of the scale. The image is compared with an exactly life-size image of the scale, thereby determining a dimensional ratio of the images compared, i.e., an error in magnification. From the magnification error, thus determined, the rotational speeds of the polygon-mirror driving motor and main motor are calculated and stored, as values for the printer function, into the initial value table 94a.

In the digital copier described above, an error in the magnification in the main scanning direction is calculated. The rotational speed of the polygon-mirror driving motor is changed in accordance with this magnification error. The rotational speed of the main motor is changed in accordance with the change in the rotational speed of the polygon-mirror driving motor, thereby minutely adjusting the magnification in the main and sub-scanning direction. Instead, an error in the magnification in the sub-scanning direction may be calculated first as is illustrated in FIG. 9. In this case, the rotational speed of the main motor is changed in accordance with the error in the magnification in the sub-scanning direction. The rotational speed of the polygon-mirror driving motor is then changed in accordance with the change in the rotational speed of the main motor, thus minutely adjusting the magnification in the main and sub-scanning direction.

As has been described, the reference clock data for the polygon-mirror driving motor 73 is calculated while the digital copier remains in the assembly line. The calculated reference clock data corresponds to an error in the magnification in which a 100%-magnification copy is to be provided. Therefore, the rotational speed of the polygon-mirror driving motor 37 is adjusted. The rotational speed of the main motor 77 is adjusted in accordance with the adjusted rotational speed of the polygon-mirror driving motor 37. The magnification in which a 100%-magnification copy should be provided can therefore be minutely adjusted.

As has been described above, different frequencies can be set for reference clock data which will be used to process image data items supplied from different sources such as the printer controller and an external facsimile apparatus. The magnifications of the images represented by these image data items can therefore be minutely adjusted independently. Thus, the present invention can provide an image forming apparatus which form images free of a pattern of alternate dark and light stripes and which forms clear images, even if the image-forming magnification is minutely adjusted to a correct one.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    light-emitting means for emitting a light beam in accordance with image data representing pixels arranged in a main scanning direction and a sub-scanning direction;
    an image carrier for forming an electrostatic latent image when scanned with the light beam emitted from the light-emitting means;
    scanning means for scanning the image carrier with the light beam emitted from the light-emitting means, said scanning means including a polygon mirror for reflecting the light beam;
    first drive means for rotating the polygon mirror;
    second drive means for rotating the image carrier, thereby to move a surface of the image carrier in the sub-scanning direction;
    developing means for applying developer onto the image carrier, thereby to develop the electrostatic latent image into a visible image;
    transfer means for transferring the visible image from the image carrier onto an image-forming medium;
    first speed-changing means for changing a rotational speed of the first drive means in accordance with an error in magnification in the main scanning direction, said error being determined from a size ratio of the visible image transferred onto the image-forming medium to an original document image; and
    second speed-changing means for changing a rotational speed of the second drive means in accordance with the change in the rotational speed of the first drive means.

2. An apparatus according to claim 1, wherein the first drive means has clock input means for inputting a reference clock data and rotates the polygon mirror at a speed corresponding to the reference clock data, and the first speed-changing means has data input means for inputting data representing the reference clock corresponding to the error.

3. An apparatus according to claim 1, further comprising data-reading means for optically reading data printed on the document sheet and for providing the data, thus read, as said image data.

4. An apparatus according to claim 1, which further comprises facsimile means for receiving facsimile data from an external apparatus and providing the facsimile data as said image data, and in which the first speed-changing means has:
    third speed-changing means for changing the rotational speed of the first drive means to a new rotational speed in accordance with an error in magnification in the main scanning direction, said error being determined from a size ratio of the visible image represented by the facsimile data and transferred onto the image-forming medium to an original document image; and
    storage means for storing data representing the new rotational speed as data at which first drive means should be rotated in order to form an image represented by the facsimile data.

5. An apparatus according to claim 1, which further comprises printer control means for receiving code data from an external apparatus, processing the code data into font data representing characters having a size represented by character size data added to the code data and providing the font data as said image data, and in which the first speed-changing means has:
    third speed-changing means for changing the rotational speed of the first drive means to a new rotational speed in accordance with an error in magnification in the main scanning direction, said error being determined from a size ratio of a size of character in the visible image represented by the code data transferred onto the image-forming medium to the size represented by the character size data; and
    storage means for storing data representing the new rotational speed as data, at which first drive means should be rotated in order to form an image represented by the code data.

6. A method of forming an image, comprising the steps of:
    emitting a light beam in accordance with image data representing pixels arranged in a main scanning direction and a sub-scanning direction;
    scanning an image carrier with the light beam in the main scanning direction by reflecting the light beam by means of a rotating polygon mirror;
    rotating the image carrier, thereby moving a surface of the image carrier in the sub-scanning direction and forming an electrostatic latent image on the surface of the image carrier;
    applying developer onto the image carrier, thereby to develop the electrostatic latent image into a visible image;
    transferring the visible image from the image carrier onto an image-forming medium;
    changing a rotational speed of the polygon mirror in accordance with an error in magnification in the main scanning direction, said magnification being determined from a size ratio of the visible image transferred onto the image-forming medium to an original document image and
    changing a rotational speed of the image carrier in accordance with the change in the rotational speed of the polygon mirror.

7. A method according to claim 6, wherein the step of scanning an image carrier includes a step of inputting a reference clock data and a step of rotating the polygon mirror at a speed corresponding to the reference clock data, and the step of changing a rotational speed of the polygon mirror includes a step of inputting data representing the reference clock corresponding to the error.

8. A method according to claim 6, further comprising a step of optically reading data printed on the document sheet and providing the data, thus read, as said image data.

9. A method according to claim 8, wherein the step of optically reading data includes a step of reading an image of a scale, and the step of changing a rotational speed of the polygon mirror includes a step of changing the rotational speed of the polygon mirror in accordance with an error in magnification in the main scanning direction, said error being determined from a size ratio of the visible image transferred onto the image-forming medium to an original scale image.

10. A method according to claim 6, which further comprises a step of receiving facsimile data representing the image of the scale and supplying the facsimile data as said image data, and in which the step of changing the rotational speed of the polygon mirror includes a step of changing the rotational speed of the polygon mirror to a new rotational speed in accordance with an error in magnification in the main scanning direction, said error being detected from a size ratio of the visible image represented by the facsimile data and transferred onto the image-forming medium to the original image of the scale, and a step of storing the new rotational speed as data, at which the polygon mirror should be rotated in order to form an image represented by the facsimile data.

11. A method according to claim 6, which further comprises a step of receiving code data from an external apparatus, processing the code data into font data representing a character having a size represented by character size data added to the code data and in which the step of changing the rotational speed of the polygon mirror includes a step of changing the rotational speed of the polygon mirror to a new rotational speed in accordance with an error in magnification in the main scanning direction, said error being determined from a ratio of a size of the character in the visible image represented by the code data and transferred onto the image-forming medium to a size represented by the character size data, and a step of storing the new rotational speed as data at which the polygon mirror should be rotated in order to form an image represented by the code data.

* * * * *